United States Patent
Jakob et al.

(10) Patent No.: US 9,214,873 B2
(45) Date of Patent: Dec. 15, 2015

(54) METHOD FOR OPERATING AN ELECTRICAL POWER RECTIFIER, AS WELL AS AN ELECTRICAL POWER RECTIFIER

(71) Applicant: GE Energy Power Conversion GmbH, Berlin (DE)

(72) Inventors: Roland Jakob, Berlin (DE); Piotr Sadowski, Berlin (DE); Thomas Bruckner, Munich (DE); Thomas Basler, Chemnitz (DE)

(73) Assignee: GE Energy Power Conversion GmbH (DE)

( * ) Notice: Subject to any disclaimer, the term of this patent is extended or adjusted under 35 U.S.C. 154(b) by 194 days.

(21) Appl. No.: 14/132,084

(22) Filed: Dec. 18, 2013

(65) Prior Publication Data

US 2014/0177306 A1 Jun. 26, 2014

(30) Foreign Application Priority Data

Dec. 21, 2012 (DE) .......................... 10 2012 224 336

(51) Int. Cl.
| | |
|---|---|
| *G05F 3/16* | (2006.01) |
| *H02M 7/219* | (2006.01) |
| *H02M 1/32* | (2007.01) |
| *H02M 7/797* | (2006.01) |
| *H02M 1/08* | (2006.01) |

(52) U.S. Cl.
CPC ............... *H02M 7/219* (2013.01); *H02M 1/32* (2013.01); *H02M 7/797* (2013.01); *H02M 1/08* (2013.01)

(58) Field of Classification Search
USPC ................. 323/902; 363/21.05, 21.07, 21.08, 363/21.13, 21.15, 21.16, 131
See application file for complete search history.

(56) References Cited

U.S. PATENT DOCUMENTS

| | | | | |
|---|---|---|---|---|
| 4,987,362 | A | | 1/1991 | Zwanziger |
| 5,737,200 | A | * | 4/1998 | Miyashita et al. ......... 363/56.03 |
| 8,040,081 | B2 | * | 10/2011 | Shimana ........................ 318/34 |

(Continued)

FOREIGN PATENT DOCUMENTS

DE 20101010380 3/2010

OTHER PUBLICATIONS

Translated German Office Action from corresponding German Application No. 102012224336.4, dated Feb. 20, 2013.

*Primary Examiner* — Adolf Berhane
*Assistant Examiner* — Gary Nash
(74) *Attorney, Agent, or Firm* — GE Global Patent Operation; Catherin J. Toppin

(57) ABSTRACT

A method for operating an electrical power rectifier. The power rectifier comprises at least two branches that are connected in parallel to each other, each of the branches comprising at least two power semiconductor elements that are connected in series. The collector-emitter voltage $V_{ce}(t)$ and/or the collector current $I_c(t)$ of one of the power semiconductor elements is detected by means of the method. Furthermore, it is determined whether at least one of the following conditions is met: $dV_{ce}(t)/dt < (dV_{ce}/dt)_{crit}$, and/or $dI_c(t)/dt < (dI_c/dt)_{crit}$, and or $I_c(t\_ent) < I_{c_{crit}}$. If at least one of the aforementioned conditions has been met, the gate-emitter voltage of at least one of the power semiconductor elements is increased.

14 Claims, 2 Drawing Sheets

(56) References Cited

U.S. PATENT DOCUMENTS

| | | | |
|---|---|---|---|
| 2004/0008530 A1* | 1/2004 | Kitahata et al. | 363/131 |
| 2011/0074364 A1* | 3/2011 | Nakajima et al. | 322/19 |
| 2012/0075761 A1* | 3/2012 | Miura et al. | 361/93.1 |

* cited by examiner

METHOD FOR OPERATING AN ELECTRICAL POWER RECTIFIER, AS WELL AS AN ELECTRICAL POWER RECTIFIER

FIELD OF THE INVENTION

Embodiments of the present invention relate to a method for operating an electrical power rectifier, as well as to an electrical power rectifier.

BACKGROUND OF THE INVENTION

Three-phase power rectifiers with which a direct-current can be transformed into an alternate-current voltage and vice versa have been known. Considering a two-phase embodiment of the power rectifier, three branches are connected parallel to each other with the use of respectively two power semiconductor elements. For example, the power semiconductor elements may be so-called IGBTs (IGBT=insulated gate bipolar transistor), each of which can be connected in parallel to an oppositely poled diode. An intermediate circuit may be connected in parallel to the three branches, i.e., in particular in the form of a capacitor. The three connecting points of the respectively two serially connected power semiconductor elements of the three branches can be connected to the phases of a three-phase electric motor or generator, for example.

If one of the two power semiconductor elements and/or the associate diode in one of the branches of the power rectifier is defective, a branch short circuit occurs in a downstream limit switch arrangement of the other power semiconductor element of the branch. This means that the parallel-connected capacitor is short-circuited via the defective element and the conductively switched other power semiconductor element of the branch is short-circuited.

Methods wherein such a branch short circuit can be detected have been known. For example, regarding this, it has been known to monitor the gate-emitter voltage or the collector current when IGBTs are used. If such a branch short circuit is detected, it has also been known to again switch at least the other—conductively connected—power semiconductor element of the branch non-conductive, namely to switch it off. In addition, it has been known to also switch off all the other power semiconductor elements or to bar them from being switched on. Therefore, it is possible to avoid a destruction of additional power semiconductor elements.

However, via the defective power semiconductor element and/or its associate diode of the one branch of the power rectifier, a short-circuit current continues to flow, i.e. via the connected electric motor or the generator and via the diodes in the two other branches. In doing so, this short-circuit current via the electric motor or the generator may follow an asymmetric course, wherein specifically the alternative-current component may be superimposed by a direct current. This may lead to critical torque changes in the electric motor or the generator and specifically result in oscillating torques.

SUMMARY OF INVENTION

Embodiments of the present invention avoid the above-explained disadvantages of known power rectifiers.

Embodiments of the present invention avoids the above-explained disadvantages via a method, as well as with an electrical power rectifier.

In accordance with an embodiment of the present invention, there is provided a method for operating an electrical power rectifier, said rectifier comprising at least two parallel-connected branches with at least two serially connected power semiconductor elements each. Referring to the method in accordance with the present invention, the collector-emitter voltage Vce(t) and/or the collector current Ic(t) are detected by at least one of the power semiconductor elements. Furthermore, it is determined whether at least one of the following conditions has been met: $dVce(t)/dt < (dVce/dt)_{crit}$ and/or $dIc(t)/dt < (dIc/dt)_{crit}$, and/or $Ic(t\_ent+delta\_t) < Ic_{crit}$. If at least one of the aforementioned conditions has been met, the gate-emitter voltage of one of the power semiconductor elements is increased.

In accordance with an embodiment of the present invention, there is provided an electrical power rectifier comprising at least two branches connected in parallel to each other, each of the branches comprising at least two power semiconductor elements connected in series; and a control device for activating the power semiconductor elements, wherein the control device is configured to detect the collector-emitter voltage Vce(t) and/or the collector current Ic(t) of at least one of the power semiconductor elements, determine whether at least one of the following conditions is met: $dVce(t)/dt < (dVce/dt)_{crit}$, and/or $dIc(t)/dt < (dIc/dt)_{crit}$, and/or $Ic(t\_ent+delta\_t) < Ic_{crit}$, and increasing the gate-emitter voltage of at least one of the power semiconductor elements if at least one of the conditions is met.

By increasing the gate-emitter voltage it is possible for a higher collector current to flow across the affected power semiconductor element, without this leading to a desaturation and the subsequent destruction of said element. Consequently, this opens up the possibility of controlling the power rectifier in a state in which those connections of the power rectifier to which the load has been connected are short-circuited. The resultant short circuit currents flowing across the load can thus develop symmetrically. If the load is an electric motor or a generator, the state of symmetry of the power rectifier has the effect that smaller torque changes occur on the load.

Therefore, with the aid of the present invention, the power rectifier can be moved into the position of detecting a branch short circuit and of switching off the appropriate power semiconductor element(s), on the one hand, as well as—in case of a load short circuit—of increasing the gate-emitter voltage of one of the power semiconductor elements, on the other hand, and of thus being able to achieve a symmetrization of the short circuit currents.

Therefore, by increasing the gate-emitter voltage, it is possible to prevent a desaturation and the subsequent destruction of power semiconductor elements due to high load-driven currents.

Additional features, possibilities of application and advantages of the invention can be inferred from the description of the exemplary embodiments of the invention hereinafter, said embodiments being represented in the associated figures of the drawings. In doing so, each of the described and presented features, individually or in any combination, represent the object of the invention, irrespective of their summarization in the patent claims or their reference, as well as irrespective of their formulation or representation in the description or in the figures.

DETAILED DESCRIPTION OF THE INVENTION

Figure 1:
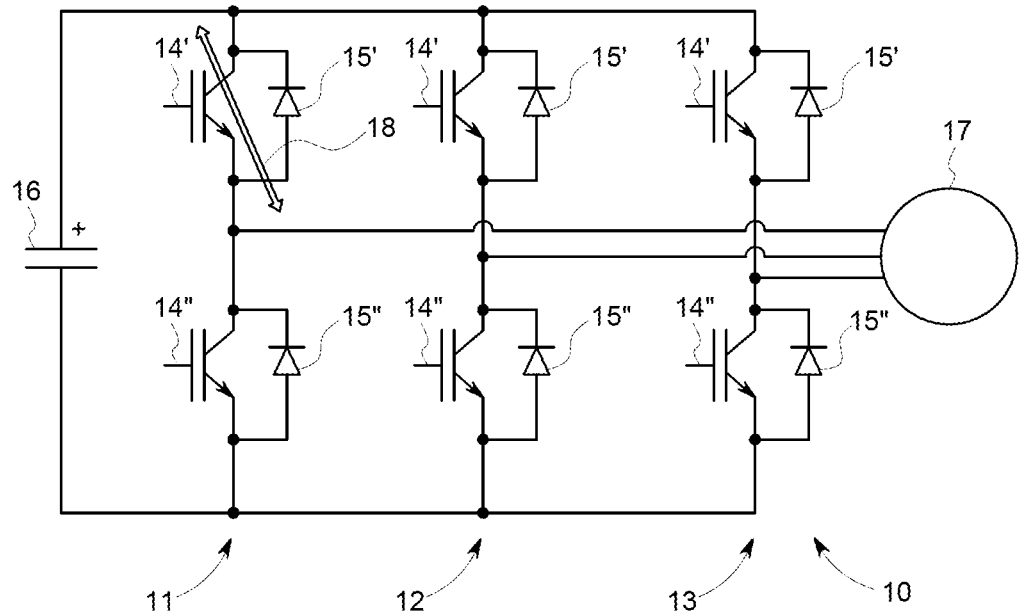
FIG. 1 is a schematic circuit diagram of an embodiment of an electrical power rectifier in accordance with the present invention.

FIG. 1 shows as an example a three-phase, two-stage power rectifier 10. The power rectifier 10 comprises three parallel-connected branches 11, 12, 13, each comprising two serially connected IGBTs 14 (IGBT=insulated gate bipolar transistor). Each of the IGBTs is parallel-connected with an oppositely poled diode 15. The three branches 11, 12, 13 of the power rectifier 10 is connected in parallel to a capacitor 16. The connecting points of the two IGBTs 14 in each of the three branches 11, 12, 13 of the power rectifier 10 are connected to one phase of a three-phase load 17, wherein the load 17 may be an electric motor provided in a triangular or star circuit, or a generator.

Each of the IGBTs 14 comprises a gate, a collector and an emitter. Each of the IGBTs 14 can assume a conductive and a non-conductive state. The gates of the IGBTs 14 are connected to a not illustrated control device, by means of which said IGBTs can be switched into a conductive or non-conductive state. The IGBTs 14 have the property that, firstly, they can be switched from their conductive into their non-conductive state even in the case of a short circuit, and that, secondly, if activated with an increased gate voltage, they can—at least for several milliseconds—carry a load short circuit current at the level of a multiple of their rated current, without being desaturated and/or destroyed.

Reference is made to the fact that, instead of the IGBTs 14, it is also possible to use other power semiconductor elements that can be switched off, in which case a power semiconductor element that can be switched off is understood to mean such an element that can also be made non-conductive and thus switched off in case of a short circuit.

Furthermore, it is pointed out that also more or fewer branches 11, 12, 13 and thus more or fewer phases may be provided in the power rectifier 10. Likewise, it is possible for the power rectifier 10 to be configured so as to comprise not only two stages but three or more stages. Furthermore, each of the IGBTs 14 can be configured as a series and/or parallel circuit of several IGBTs and/or the capacitor 16 may be configured as a series and/or parallel circuit of several capacitors.

In normal operating mode of the power rectifier 10 the IGBTs 14 are activated by the control device in such a manner that—in the case an electric motor is provided—the direct voltage applied to the capacitor 16 is transformed into an alternate voltage applied to the three phases of the electric motor 17 or that—in the case of a generator—the alternate current applied to the three phases of the generator 17 is transformed into a direct voltage applied to the capacitor 16.

Let it now be assumed that in the aforementioned normal operating mode of the power rectifier 10, one of the IGBTs 14 and/or its associate diode 15 suffers a defect resulting in a short circuit of the corresponding element. Such a defect may, for example, be a shorting of the collector-emitter line of the IGBT 14 and/or the anode-cathode line of the associate diode 15. In FIG. 1 the aforementioned defect is indicated by a double arrow in the upper IGBT 14' or its associate diode 15' of the left branch 11. Therefore, a short circuit 18 in the power rectifier 10 exists at this point.

As soon as the additional lower IGBT 14" is switched conductive in the same branch 11 a branch short circuit is created across the entire left branch 11. By means of a short circuit detection that is not specifically described in the present case, this branch short circuit is detected and the lower IGBT 14" present in the same branch 11 of the short circuit 18 is switched off within a few microseconds.

Additionally, it is pointed out that the additional IGBTs 14 in the two other branches 12, 13 remain largely unaffected by the aforementioned measures.

Referring to the aforementioned short circuit detection, it is possible, for example, to monitor the desaturation of the lower IGBTs 14". To accomplish this, at least one of the following operating parameters on the IGBT 14" can be determined over time t: the collector-emitter voltage Vce(t) and/or the collector current Ic(t). The determination of these operating parameters can be accomplished in any desired manner, for example, by performing measurements with the aid of a sensor. It is understood that the same applies to the other IGBTs as regards the detection of a short circuit. If, after switching off the lower IGBTs 14" of the left branch 11, for example the upper IGBT 14' in the center branch 12 is switched so as to be conductive, now an at least one-phase load short circuit does exist. In this case, two phases of the load 17 are short-circuited with each other across the short circuit 18, on the one hand, and the conductively switched upper IGBT 14' of the center branch 12, on the other hand. In the case of this load short circuit a short circuit current flows through the upper IGBT 14' of the center branch 12. The same may also apply to the third phase of the load 17.

It is now determined whether one of the three following conditions has been met on this upper IGBT 14' of the center branch 12:

$$dVce(t)/dt < (dVce/dt)_{crit}$$

and/or $$dIc(t)/dt < (dIc/dt)_{crit}$$

and/or $$Ic(t\_ent + \text{delta}\_t) < Ic = it,$$

wherein t_ent is the time of the start of the desaturation of the affected IGBT and delta t represents a time delay that can be prespecified.

Considering the first condition, it is checked whether the speed of the increase of the collector-emitter voltage of the upper IGBT 14' of the center branch through which the short circuit current flows is potentially lower at the time of desaturation t_ent of this IGBT than the prespecifiable critical value. Considering the second condition, it is checked whether the speed of the increase of the collector-emitter current of the upper IGBT 14' of the center branch 12 through which the short circuit current flows is potentially lower than a prespecifiable critical value. And, considering the third condition, it is checked whether the collector-current at the time after expiration of the time delay delta t upon the start of the desaturation of the IGBT 14' of the center branch 12 through which the short circuit current flows is smaller than a prespecifiable critical value. These conditions can be checked, for example, with the aid of the control device.

It is understood that the corresponding conditions also apply to the other IGBTs 14', 14" of the center and right branches 12, 13, provided that they, upon switching off the short circuit in the left branch 11, are switched so as to be conductive or have already been switched so as to be conductive.

The critical values $(dVce/dt)_{crit}$, $(dIc/dt)_{crit}$ and/or $IC_{crit}$ are selected in such a manner that a distinction is possible between a branch short circuit of the power rectifier 10 caused by a defective IGBT 14, on the one hand, and a load short circuit of the load 17 connected to the power rectifier 10 caused by the defective rectifier 10, on the other hand.

In particular, at least one of the aforementioned critical values is not reached when—within a branch 11, 12, 13 of a power rectifier 10—a branch short circuit, for example short circuit 18, has been switched off and, subsequently, the short circuit current of the load short circuit continues to reach high values.

One of the conditions or a combination of two conditions or of all three conditions may be used for the aforementioned distinction. The mentioned distinction will be explained in detail further below with reference to FIG. 2.

In that case, the aforementioned branch short circuit should be switched off, as has already been explained, whereas the load short circuit should be handled differently, as will be explained hereinafter.

If a verification of the aforementioned conditions shows that at least one of the conditions has been met, then—in the present case—the upper IGBT 14' of the center branch 12 is continued to be switched conductive, and the gate-emitter voltage of the upper IGBT 14' is increased. In addition, the lower IGBT 14" of the center branch 12 is optionally switched non-conductive or its conductive end switch is blocked.

In addition, it is pointed out that—if at least one of the conditions has been met—the aforementioned switching-off of the short circuit may be omitted. This is also done, correspondingly, with the right branch 13. Thereafter, the power rectifier 10 is in a state in which, one the one hand, the short circuit 18 exists in the left branch 11, and, in which, on the other hand, the two upper IGBTs 14' of the center and right branches 12, 13 are switched so as to be conductive at an elevated gate-emitter voltage. This represents a state of symmetry, because the positive pole of the capacitor 16 is connected in the second branch 11—via the upper IGBT 14' of the center branch 12 and via the upper IGBT 14' of the right branch—to one different phase of the load 17, respectively.

In view of the increase of the gate-emitter voltage Vge of the two upper IGBTs 14' of the center and right branches 12, 13, the following needs to be added:

In normal operating mode of one IGBT, its gate-emitter voltage is adjusted, for example, to a value of approximately 15 Volts. If, in this case, the collector-emitter voltage of the conductively switched IGBT exceeds a value of 12 Volts, for example, a desaturation of the IGBT is given. This state can result in a destruction of the IGBT. With the already mentioned short circuit detection it is possible to detect this state, and the IGBT can be switched off within a few microseconds as has already been mentioned.

Referring to the aforementioned increase of the gate-emitter voltage, there is provided a value—different from the aforementioned approximate 15 Volts—which is at least high enough to prevent a desaturation of the IGBT. This means that, with the increased gate-emitter voltage, there is no desaturation of the IGBT, and thus it is possible for a considerably higher collector current to flow freely across the IGBT than is possible in the case with the gate-emitter voltage of 15 Volts.

For example, the increased gate-emitter voltage may have a value within the range of approximately 30 Volts to approximately 70 Volts. Thus, as a result of the increased gate-emitter voltage, it is possible in the aforementioned exemplary embodiment for the two conductively switched upper IGBTs 14' of the center and the right branches 12, 13 to also result in higher collector currents without being destroyed.

In doing so, it is possible that, in the mentioned state of symmetry of the power rectifier 10, optionally existing current can flow via the short circuit 18 as well as via the two upper IGBTs 14' of the center and right rectifiers 12, 13, without this leading to a destruction of the IGBTs 14'. Due to the state of symmetry of the power rectifier 10, these currents lead to lower torque changes on load 17, namely the electric motor or the generator.

It is pointed out that the short circuit 18 may exist not only in the region of the upper IGBTs 14' as shown by FIG. 1, but may also exist in the region of the lower IGBTs 14". Likewise, a short circuit of each of the two IGBTs 14' and/or 14" in each of the phases may exist. In these cases, the explained method is performed in an appropriately adapted manner.

A corresponding adaptation also takes place when the power rectifier 10 is configured as a three-phase or multiple-phase device. In these cases it is possible that—in each branch in which the short circuit 18 exists—one or more IGBTs connected in series thereto must be switched conductive with a higher gate-emitter voltage.

It is also pointed out that the short circuit or short circuits in branch 11 may also exist in one of the two other branches 12, 13.

Hereinafter, the already mentioned distinction between a branch short circuit of the power rectifier 10 caused by a defective IGBT, on the one hand, and a load short circuit of the load 17 connected to the power rectifier 10 caused by a load short circuit, on the other hand, will be explained in detail with reference to FIG. 2.

Figure 2:
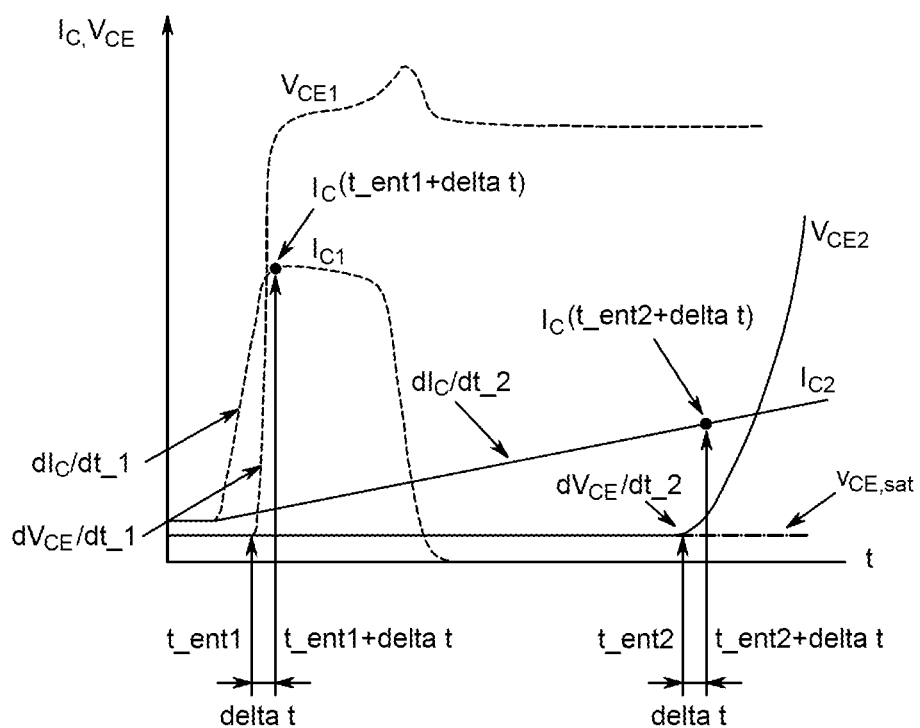
FIG. 2 is a schematic time-dependency diagram of the behavior of currents and voltages on a power semiconductor element of the power rectifier as in FIG. 1.

FIG. 2 shows a graph of the collector current Ic(t) and the collector-emitter voltage Vce(t) for an IGBT, in each case over time t, for two cases. The first case is shown in dashed lines and provided with the additional reference sign Ic1 and relates to a branch short circuit. The second case is shown in solid lines and provided with the additional reference sign Ic2 and relates to a load short circuit.

In the first case, i.e., in the case of a branch short circuit as can occur in connection with the short circuit 18 as in FIG. 1, the collector current Ic1 increases very steeply up to a multiple of the rated current, for example, up to five to ten times the rated current. At the time t_ent1 the IGBT desaturates very rapidly after the start of the branch short circuit which has the same meaning as the very rapid increase of the collector-emitter voltage Vce1 to a value on the order of the driving voltage.

As has been explained, in this first case, the IGBT must be switched off within a few microseconds, for example 10 microseconds, in order to prevent a destruction of the IGBT.

In the second case, i.e., in the case of a load short circuit as can occur following the explained branch circuit as in FIG. 1, the current Ic2 increases less steeply, which is in particular due to the leakage inductance of the turns of the load 17. The result of this is that a longer period of time passes until the IGBT is desaturated at time t_ent2 and thus the collector-emitter voltage Vce2 increases noticeably.

The first of the three distinction conditions mentioned in conjunction with FIG. 1 is the following: $dVce(t)/dt < (dVce/dt)_{crit}$. In doing so, this condition relates essentially to the time t_ent of desaturation of the respective IGBT.

As has been explained hereinabove, the collector-emitter voltage Vce increases considerably more rapidly in a branch short circuit than in a load short circuit. Regarding this, reference is made to the time curve of the collector-emitter voltages Vce1 and Vce2 in FIG. 2. The value $dVce(t)/dt$ is thus greater in a branch short circuit than in a load short circuit: dVce/dt_1>dVce/dt_2. Consequently, if the value $(dVce/dt)_{crit}$ is set between the expected values dVce/dt_1 and dVce/dt_2 for the branch circuit and the load short circuit, a distinction can be made between a branch short circuit and a load short circuit.

The second of the three distinction conditions mentioned in conjunction with FIG. 1 is the following: dIc(t)/dt< $(dIc/dt)_{crit}$. In doing so, this condition essentially relates to the time t_ent of desaturation of the respective IGBT.

As has been explained hereinabove, the collector current Ic increases substantially more rapidly in a branch short circuit than in a load short circuit. Regarding this, reference is made to the time curve of the collector current Ic1 and Ic2 shown in FIG. 2. The value dIc(t)/dt is thus greater in a branch short circuit than in a load short circuit: dIc/dt_1>dIc/dt_2. Therefore, if the value $(dIc/dt)_{crit}$ is approximately between the expected values dIc/dt_1 and dIc/dt_2 for the branch short circuit and the load short circuit, a distinction can be made between a branch short circuit and a load short circuit.

The third of the three distinction conditions mentioned in conjunction with FIG. 1 is the following: Ic(t_ent+delta_t)<$Ic_{crit}$, wherein t_ent is the time when the desaturation of the IGBT starts and delta t is a prespecifiable time delay.

As can be inferred from FIG. 2 the collector current Ic(t_ent1+delta t) at the time (t_ent1+delta t) in a branch short circuit is higher than the collector current Ic(t_ent2+delta t) at the time (t_ent2+delta t) in a load short circuit. Therefore, if the value $Ic_{crit}$ is set approximately between the expected value Ic(t_ent1+delta t) for the branch short circuit and the expected value Ic(t_ent2+delta t) for the load short circuit, a distinction can be made between a branch short circuit and a load short circuit.

As has already been explained, it is possible to make a distinction between the case of a branch short circuit and the case of a load short circuit with the application of one, two or all three conditions. As has also been explained, the respective IGBT in a branch short circuit is switched off within a few microseconds, whereas, in a load short circuit, the gate emitter voltage of the respective IGBT is increased and the IGBT is switched so as to be conductive.

If a load short circuit is detected and the gate-emitter voltages of the respective IGBT is increased, this has the result that, thereafter, the collector-emitter voltage no longer increases, as is shown regarding the collector-emitter voltage Vce2 in FIG. 2, but that the collector-emitter voltage essentially remains at the initial value. The latter is indicated in dotted lines in FIG. 2 and marked as Vce,sat. This means that a desaturation of the IGBT does not occur.

Principally, the gate-emitter voltage can be increased with the aid of the mentioned control device.

Figure 3A:
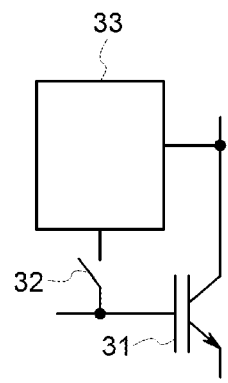
FIGS. 3A, 3B, and 3C are schematic circuit diagrams of the electric wiring of a power semiconductor element of the power rectifier as in FIG. 1.
Figure 3B:
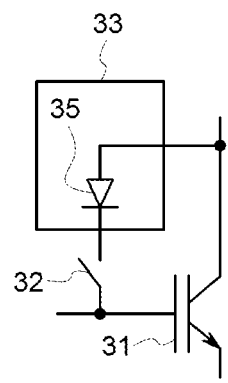
Figure 3C:
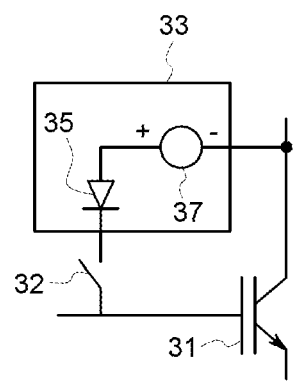

FIGS. 3A, 3B, and 3C show alternative wiring arrangements of the IGBTs 14 of the power rectifier 10, said arrangements potentially achieving an increase of the gate-emitter voltage.

Each of FIGS. 3A, 3B, and 3C shows a general wiring arrangement comprising an IGBT 31 that is to act representatively for the IGBTs 14 of the power rectifier 10. The gate of the IGBT 31 is connected to the collector of the IGBT 31 via a switch 32 and a circuit 33.

The switch 32 is activated by the aforementioned control device in such a manner that the switch 32 is non-conductive in normal operating mode of the power rectifier 10, that, however, the switch 32 is switched so as to be conductive if one of the three mentioned conditions of distinction are met.

The circuit 33 of FIG. 3A is quite generally intended to provide the gate-emitter voltage of the IGBT 31 with a desired value or a desired progression. In particular, the circuit 33 is intended to increase the gate-emitter voltage of the IGBT 31.

FIG. 3B shows a first exemplary embodiment of the circuit 33, wherein the collector of the IGBT 31 is connected to the gate of the IGBT 31 via a diode 35 switched in passing direction and via the switch 32.

Considering this wiring, the gate-emitter voltage of the IGBT 31 is always lower by the amount of the voltage dropping on the diode 35 than the collector-emitter voltage of the IGBT 31. By closing the switch 32, the gate-emitter voltage of the IGBT 31 is thus increased approximately to the value of the collector-emitter voltage. As has been explained, this increase of the gate-emitter voltage prevents a desaturation of the IGBT 31.

FIG. 3C shows a second exemplary embodiment of the circuit 33, wherein the collector of the IGBT 31 is connected to the gate of the IGBT 31 via an offset voltage source 37, via the diode 35 and via the switch 31. In doing so, the negative pole of the offset voltage source 37 is connected to the collector of the IGBT 31.

Considering this wiring, the gate-emitter voltage of the IGBT 31 can be linked to the collector-emitter voltage of the IGBT 31 in the desired manner with the aid of the offset voltage source 37. In particular, the gate-emitter voltage can be adjusted to almost any desired value in view of the collector-emitter voltage of the IGBT 31. By closing the switch 32, the gate-emitter voltage of the IGBT 31 is increased to the desired value of the collector-emitter voltage. As has been explained, this increase of the gate-emitter voltage prevents a desaturation of the IGBT 31.

Additionally, it is pointed out that the arrangement of the switch 32 and the circuit 33 may also be reversed. Furthermore, it is also possible to make the design of the circuit 33 substantially more comprehensive. For example, elements for limiting the voltage, or connections for a supply voltage, or returns to the control device may be provided.

This written description uses examples to disclose the invention, including the preferred embodiments, and also to enable any person killed in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating an electrical power rectifier, wherein the power rectifier comprises at least two branches that are connected in parallel to each other, each of the branches comprising at least two power semiconductor elements connected in series, the method comprising:
   detecting the collector-emitter voltage and/or the collector current of at least one of the power semiconductor elements;
   determining whether at least one of the following conditions is met: a first condition wherein a speed of increase of the collector-emitter voltage is lower, at a time of desaturation of the at least one of the power semiconductor elements, than a first prespecified value, and/or a second condition wherein a speed of increase of the collector current at the time of desaturation is lower than a second prespecified value, and/or a third condition wherein the collector current, at a time after expiration of a time delay after the desaturation has started, is smaller than a third prespecified value; and increasing the gate-emitter voltage of at least one of the power semiconductor elements if at least one of the conditions is met.

2. The method of claim 1, further comprising determining whether the first and/or second conditions have been or are met approximately at the time of desaturation of the power semiconductor element.

3. The method of claim 1, wherein the first, second, and third prespecified values are prespecified in such a manner that at least one of the values is not reached when a load short circuit exists on a load connected to the power rectifier.

4. The method of claim 3, wherein, in case of a load short circuit, a symmetrization of the short circuit currents is achieved with the aid of the increase of the gate-emitter voltage.

5. The method of claim 1, wherein the increase of the gate-emitter voltage is at least great enough to prevent a desaturation of the affected power semiconductor element.

6. The method of claim 1, further comprising:
detecting a defective power semiconductor element with the aid of a short circuit detection; and
determining in which of the branches the defective power semiconductor element exists.

7. The method of claim 6, wherein the gate-emitter voltage is increased on the power semiconductor elements of the other branches of the power rectifier.

8. The method of claim 6, further comprising determining on which of the at least two power semiconductor elements of the affected branch the defect exists, and wherein the gate-emitter voltage is increased on the corresponding power semiconductor elements of the other branches.

9. An electrical power rectifier comprising:
at least two branches connected in parallel to each other, each of the branches comprising:
at least two power semiconductor elements connected in series; and
a control device for activating the power semiconductor elements, wherein the control device is configured to:
detect the collector-emitter voltage and/or the collector current of at least one of the power semiconductor elements,
determine whether at least one of the following conditions is met: a speed of increase of the collector-emitter voltage is lower, at a time of desaturation of the at least one of the power semiconductor elements, than a first prespecified value, and/or a speed of increase of the collector current at the time of desaturation is lower than a second prespecified value, and/or the collector current, at a time after expiration of a time delay after the desaturation has started, is smaller than a third prespecified value, and
increase the gate-emitter voltage of at least one of the power semiconductor elements if at least one of the conditions is met.

10. The electrical power rectifier according to claim 9, wherein the at least two power semiconductor elements comprises IGBTs that can be switched off.

11. The electrical power rectifier according to claim 9, wherein, between a collector and a gate of at least one of the power semiconductor elements, a switch and a circuit are connected, with the aid of which the gate-emitter voltage of the power semiconductor element can be increased.

12. The electrical power rectifier according to claim 11, wherein the circuit comprises a diode.

13. The electrical power rectifier according to claim 12, wherein the circuit comprises an offset voltage source.

14. The electrical power rectifier according to claim 9, wherein the first prespecified value is set between expected values of a speed of increase of a collector-emitter voltage associated with a branch short circuit and a speed of increase of a collector-emitter voltage associated with a load short circuit, and wherein the second prespecified value is set between expected values of a speed of increase of a collector current associated with the branch short circuit and a speed of increase of a collector current associated with the load short circuit, and wherein the third prespecified value is set between an expected collector current, at the time after the expiration of the time delay, associated with the branch short circuit and an expected current, at the time after the expiration of the time delay, associated with the load short circuit.

* * * * *